(12) United States Patent
Parrott

(10) Patent No.: US 6,351,533 B1
(45) Date of Patent: Feb. 26, 2002

(54) SYSTEM AND METHOD FOR PROTECTING DEVICES CONNECTED TO A TELEPHONE LINE

(75) Inventor: William M. Parrott, Simi Valley, CA (US)

(73) Assignee: Xircom, Inc., Thousand Oaks, CA (US)

( * ) Notice: Subject to any disclaimer, the term of this patent is extended or adjusted under 35 U.S.C. 154(b) by 0 days.

(21) Appl. No.: 09/237,781

(22) Filed: Jan. 26, 1998

(51) Int. Cl.⁷ .............................................. H04M 11/00
(52) U.S. Cl. .................. 379/412; 379/93.05; 379/27.01
(58) Field of Search .................................. 379/412, 414, 379/418, 372–376, 24, 25, 27, 28, 31, 32, 93.05–93.11, 93.27, 399, 27.01, 27.05, 32.01, 32.04

(56) References Cited

U.S. PATENT DOCUMENTS

| 3,614,324 A | 10/1971 | Buzzard |
| 3,746,798 A | 7/1973 | Thomas |
| 3,816,669 A | 6/1974 | Meri |
| 3,829,619 A | 8/1974 | Close et al. |
| 3,838,223 A | 9/1974 | Lee et al. |
| 3,903,375 A | 9/1975 | DeWit |
| 4,126,765 A | 11/1978 | Calder et al. |
| 4,317,964 A | 3/1982 | Biggs et al. |
| 4,326,104 A | 4/1982 | Bergida |
| 4,395,590 A | 7/1983 | Pierce et al. |
| 4,408,248 A | 10/1983 | Bulley et al. |
| 4,506,112 A | 3/1985 | Bitsch |
| 4,528,425 A | 7/1985 | Melindo et al. |
| 4,529,845 A | 7/1985 | Boeckmann |
| 4,536,619 A | 8/1985 | Hamatani et al. |
| 4,558,183 A | 12/1985 | Corris et al. |
| 4,603,234 A | 7/1986 | Huet et al. |
| 4,640,988 A | 2/1987 | Robinton |
| 4,709,296 A | 11/1987 | Hung et al. |
| 4,723,267 A | 2/1988 | Jones et al. |
| 4,742,536 A | 5/1988 | Dewenter et al. |
| 4,845,741 A | 7/1989 | Fourdraine |
| 4,856,059 A | 8/1989 | Halbig |
| 4,893,335 A | 1/1990 | Fuller et al. |
| 4,896,352 A | 1/1990 | Dabin |
| 4,947,426 A | 8/1990 | Montano |
| 4,947,427 A | 8/1990 | Rosch et al. |
| 4,958,371 A | 9/1990 | Damoci et al. |
| 4,979,071 A | 12/1990 | Ito et al. |
| 4,987,586 A | 1/1991 | Gross et al. |
| 5,003,580 A | 3/1991 | Duong et al. |
| 5,042,065 A | 8/1991 | Kim |

(List continued on next page.)

FOREIGN PATENT DOCUMENTS

EP        0 165 516 A2    12/1985

OTHER PUBLICATIONS

Braquet et al., "DC Current Bypass for a Line Transformer," IBM Technical Disclosure Bulletin, 09/80, p. 1479, vol. 23, No. 4, IBM Corp.

No Author, "Telephone Line Powered Operation With FCC Part 68 Isolation," IBM Technical Disclosure Bulletin, 07/85, pp. 668–669, vol. 28, No. 2, IBM Corp.

No Author, "Low Loss DC Current Sensing," 11/88, Web-site: http://patent.womplex.ibm.com/tdbs/TDB?& order= 88A+61913.

Primary Examiner—Wing F. Chan
(74) Attorney, Agent, or Firm—Lyon & Lyon LLP

(57) ABSTRACT

The present invention is embodied in a system and method for protecting an electronic device connected to a telephone line. The system includes a detector, sensor and protector. The detector determines a resistance built-in to the telephone line, the sensor utilizes the resistance of the telephone line to determine if the telephone line is a digital line and the protector prevents the electronic device from prolonged connection with the telephone line if it is a digital line.

26 Claims, 5 Drawing Sheets

U.S. PATENT DOCUMENTS

| | | |
|---|---|---|
| 5,125,027 A | 6/1992 | Blaszykowski et al. |
| 5,140,631 A | 8/1992 | Stahl |
| 5,144,287 A | 9/1992 | Remson |
| 5,146,384 A | 9/1992 | Markovic et al. |
| 5,208,718 A | 5/1993 | Fox |
| 5,224,154 A | 6/1993 | Aldridge et al. |
| 5,315,651 A | 5/1994 | Rahamim et al. |
| 5,329,584 A | 7/1994 | Nagato |
| 5,361,296 A | 11/1994 | Reyes et al. |
| 5,369,666 A | 11/1994 | Folwell et al. |
| 5,392,349 A | 2/1995 | Elder, Jr. |
| 5,426,692 A * | 6/1995 | Fujise ..................... 379/93.06 |
| 5,426,698 A | 6/1995 | Reymond |
| 5,432,835 A | 7/1995 | Hashimoto |
| 5,440,619 A | 8/1995 | Cann |
| 5,442,694 A | 8/1995 | Chitrapu et al. |
| 5,490,210 A | 2/1996 | Sasso |
| 5,506,868 A | 4/1996 | Cox et al. |
| 5,532,898 A | 7/1996 | Price ........................... 361/119 |
| 5,594,680 A | 1/1997 | Ohtake et al. |
| 5,606,704 A | 2/1997 | Pierce et al. |
| 5,631,797 A | 5/1997 | Chabinec et al. |
| 5,694,603 A | 12/1997 | Reiffin |
| 5,696,660 A | 12/1997 | Price |
| 5,712,910 A | 1/1998 | Saito |
| 5,751,803 A | 5/1998 | Shpater |
| 5,777,836 A | 7/1998 | Price et al. |
| 5,783,999 A | 7/1998 | Price et al. |
| 5,802,151 A | 9/1998 | Bevill, Jr. et al. |
| 5,809,068 A | 9/1998 | Johnson |
| 5,835,578 A | 11/1998 | Reyes et al. |
| 5,946,393 A | 8/1999 | Holcombe |
| 5,991,604 A | 11/1999 | Yi |
| 6,031,867 A | 2/2000 | Johnson et al. |
| 6,061,445 A | 5/2000 | Rahamim et al. |
| 6,081,587 A | 6/2000 | Reyes et al. |
| 6,088,446 A | 7/2000 | Huang |
| 6,091,806 A | 7/2000 | Rasmus et al. |
| 6,188,764 B1 | 2/2001 | Huang et al. |

\* cited by examiner

SYSTEM AND METHOD FOR PROTECTING DEVICES CONNECTED TO A TELEPHONE LINE

BACKGROUND OF THE INVENTION

1. Field of the Invention

The present invention generally relates to modem communications, and in particular to a system and method for protecting the digital access arrangement of a modem when the modem is connected to a digital telephone line.

2. Related Art

Digital devices, such as computers, can utilize analog modems to communicate between each other across a central telephone office's Public Switched Telephone Network (PSTN). PSTN telephone lines are analog telephone lines. The analog modem provides communication by modulating outgoing digital signals of the digital device to allow usability of the outgoing signal by the PSTN telephone lines. Similarly, the analog modem demodulates incoming analog telephone signals of the PSTN telephone line to allow usability of the incoming signal by the digital device.

Typically, analog modems contain delicate integrated circuit components and a digital access arrangement in order to provide communication across the PSTN telephone lines. The digital access arrangement (DAA) is a circuit that interfaces high voltage devices, such as telephone lines, with the modem's delicate integrated circuit components, which usually operate at voltage levels ranging from only 3 to 5 volts. The DAA typically isolates the high voltage and provides a barrier from the telephone line voltages. Also, the DAA protects the modem from harmful high voltage spikes originating from the telephone lines. Other non-protective functions of the DAA include, detecting an incoming ring signal, controlling seizure and release of the telephone line, drawing current from the telephone line to maintain connection with the central telephone office, and passing the modem audio tones in both directions, with minimum distortion. It should be noted that the term audio tones used here is a brief way of describing the complex waveforms normally associated with the complex protocols utilized in modem communications.

Although a PSTN telephone line is typically biased with 48 volts (nominal), the PSTN voltage is extremely current-limited at the central office. Namely, in normal applications, the 48 volts drops to a nominal 5 to 15 volts when a compatible telephone desk set, or equivalent, is connected to the telephone line. The central office's current limiting circuitry, together with the actual resistance of the telephone line is commonly referred to as line resistance. It should be noted that the main element of the line resistance is the current limiting circuitry. Because of this current limiting circuitry, compatible telephones, analog modems and related devices are not required to dissipate large amounts of energy. Thus, current DAA's of analog modems sufficiently protect the modem from PSTN telephone lines.

However, with the advent of alternative telecommunication schemes, the delicate circuitry of analog modems are at risk. This is because there is no telephone line standard for non-PSTN systems, and many different protocols are in common use that are incompatible with PSTN telephone devices, such as analog modems. In some cases, the incompatibility can cause damage to the analog modems. Many common alternative schemes utilize radio frequency (RF) carriers on the telephone line, modulated by a digital stream of data. Also, many of these alternative schemes permit numerous telephones to share the same physical telephone line, with each individual telephone having an assigned time slot. One such system in use is the T1 system, which uses a carrier of 1.544 MHz. The telephone line used in these schemes is usually referred to as a digital line. These schemes are commonly found in office buildings, hotels and similar environments.

In addition, in these alternative systems it is customary to bias the telephone lines with approximately 48 volts. However, this biasing is utilized to power remote compatible telephones and to provide ongoing current, commonly referred to as sealing current. Sealing current prevents circuit deterioration due to corrosion and oxidation that plagues no-current (dry) circuitry. Thus, the bias voltage for these alternate systems is not current limited like the PSTN telephone lines. As such, these alternate systems can deliver more than 250 milliamps (12 watts) of power to devices connected to these alternate systems. Therefore, connecting a non-compatible device, such as an analog modem, can result in overheating and rapid destruction of the non-compatible device.

Unfortunately, these new alternative schemes are often undetected by the analog modem user. This is because it is impossible for a user to visibly determine whether a random telephone line jack connects to a PSTN telephone line or a digital line because both systems typically use the same RJ-11 connector jack. Consequently, an incompatible connection by an unwary modem user can cause damage to the delicate components of the modem. Many current analog modems are not designed to protect the DAA and delicate integrated circuits from potentially hazardous digital telephone lines. This is because most analog modems are designed with the assumption that the user is knowingly connecting the analog modem to a PSTN telephone line only.

One current attempt to solve this problem involves adding a small precision resistor in series with the telephone line and measuring the voltage drop across this resistor. However, the added resistance drops the available DC voltage, which in turn degrades performance at low currents. Also, since this technique requires tightly specified parts that are expensive, the overall cost of the modem is unduly increased. Another technique involves using a handheld detection device. The handheld detection device determines whether a telephone line is a digital or a PSTN telephone line when the device is inserted into the telephone line jack in question. However, this technique is undesirable because it requires the user to purchase a separate product, requires inconvenient insertion of the device into a telephone jack before each use of the modem, and is subject to human error, i.e., forgetfulness and improper use.

Therefore what is needed is a digital line protection system and method that automatically protects the analog modem from potentially hazardous digital telephone lines without adding undue expense and user inconvenience. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for protecting an electronic device connected to a telephone line.

The system includes a detector, alarm circuit and protector. The detector tests the voltage drop shortly after the modem seizes the telephone line and determines the overall resistance of the telephone line and the central office limiting circuitry. As previously discussed, a PSTN telephone line will cause a major voltage drop, while a digital line will not cause any significant drop at all. The system uses this logic to determine if the line is a digital line after testing the voltage drop. The alarm circuit recycles the ring signal of the telephone line and utilizes the ring detect signal as an alarm signal if the line is found to be a digital line. The alarm circuit can, if necessary, activate a current limiting protective circuit, drop the telephone connection, or activate other suitable functions as desired. The protector is a specialized circuit to protect delicate capacitors of certain circuits of the modem, such as the audio-transformer circuit, from damage during brief sequences, such as digital line test sequences. The protector can be a surge current protector for diverting potentially damaging energy produced by the digital line from sensitive components of the electronic device during connection with the digital line.

The system and method of the present invention does not degrade the performance of the electronic device, such as a modem, and does not require tightly specified or expensive parts. Also, the system and method of the present invention is convenient because it automatically protects the modem from potentially damaging digital telephone lines and eliminates user inconvenience without adding undue expense.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

The present invention can be further understood by reference to the following description and attached drawings, which illustrate the preferred embodiment.

Other features and advantages will be apparent from the following detailed description of the preferred embodiment, taken in conjunction with the accompanying drawings, which illustrate, by way of example, the principles of the invention.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

Figure 1:
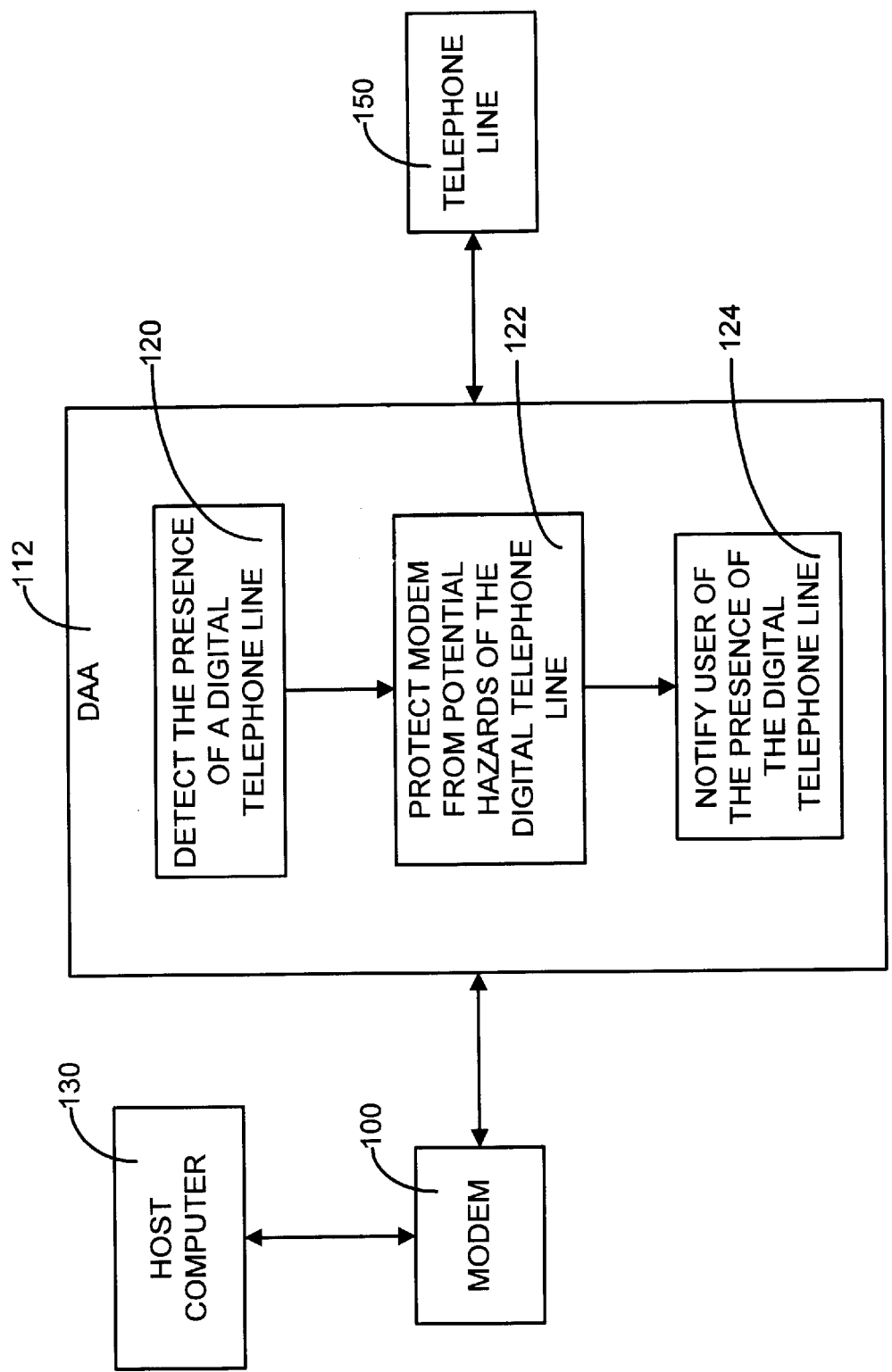
FIG. 1 is a block diagram illustrating a general overview of the system of the present invention.

FIG. 1 is a block diagram illustrating a general overview of the system of the present invention. The present invention is embodied in a system and method for automatically protecting the low voltage circuits of modem 100 from the potential hazards of digital telephone lines. The present invention can be implemented as an inexpensive modification to a modem's digital access arrangement (DAA) and its corresponding interface software. Alternatively, the present invention can be implemented as a stand alone (DAA), without software modification.

Both implementations are preferably implemented as a new (DAA) 112 to detect the presence of a digital line (box 120), protect the modem from potential hazards of the digital line (box 122), and notify the user of the digital line (box 124). Notification can be, for example, via an interface with a host computer 130. These functions are performed automatically and within milliseconds after the user unknowingly attempts to connect the modem 100 to a telephone line 150 that is a digital telephone line.

Components and Operation

Figure 2:
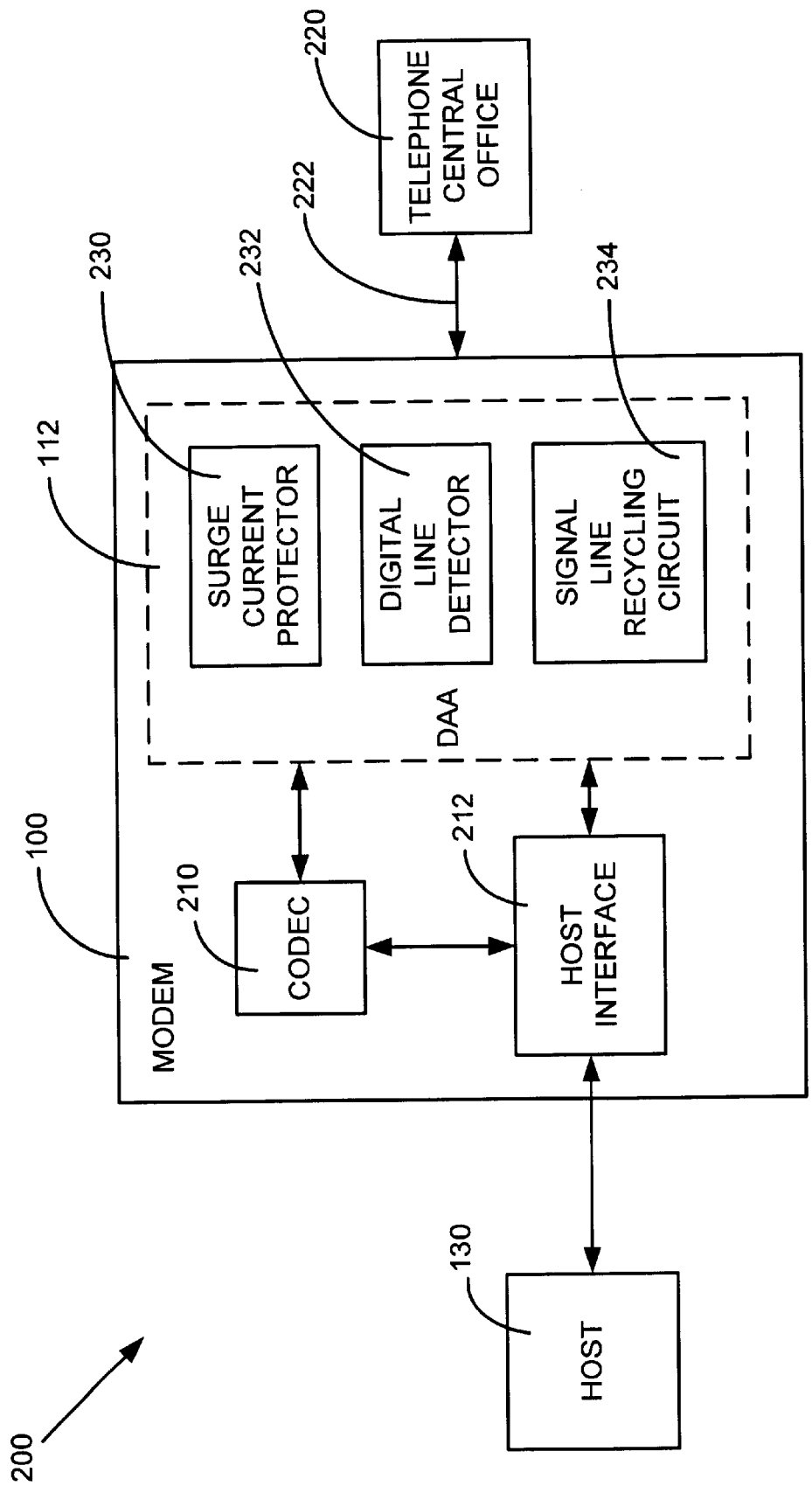
FIG. 2 is a block diagram illustrating the general components of the present invention.

FIG. 2 is a block diagram illustrating the general components of the present invention. The system 200 includes the modem 100 having the DAA 112 coupled to a CODEC 210, which is coupled to a host interface 212. The modem 100 is coupled between a telephone central office 220 via a telephone line 222 and the host 130, which can be a computer, such as a desktop or portable computer, fax machine, dumb terminal or similar device. The telephone line 222 can be a PSTN telephone line or a digital telephone line.

For a PSTN telephone line, the CODEC 210 receives digital input signals from the host device 130 and converts the digital signals into auditory tone signals for transmission over the PSTN telephone line. The CODEC 210 also simultaneously receives incoming auditory tone signals from the PSTN telephone line and converts the auditory tone signals into digital signals. An adjacent hybrid circuit (not shown) can be used to isolate the outgoing signal from the incoming signal. The host interface 212 coupled to the CODEC 210 is preferably a small microcontroller or microprocessor and is the central processing unit of the modem 100. The host interface 212 interfaces the host 130 with the modem 100, issues commands, tests tones, etc. as required.

The PSTN telephone line 222 from the telephone central office 220 is typically energized with (nominally) 48 volts DC. The PSTN telephone line has a current limiting mechanism that is a factor for determining the DC current flow of the system 200. When the modem 100 is inactive (on hook), the entire voltage of the central office 220 appears at the input line of the modem 100. Since no current is being drawn, there is no voltage drop. When the modem 100 seizes the telephone line 222, current flows from the central office 220 and through series resistance of the telephone office 220, resistance of the telephone line, and resistance of the DAA's 112 circuitry. Typically the current is between approximately 10 mA and 120 mA. The line voltage, as seen at the modem 100, drops from its 48 volt on hook value to between approximately 5.0 and 15 volts. Variations of the voltage and current are dependent on the distance from the central office 220, gauge of wire used by the telephone company, and the details of any given modem design.

For digital telephone lines, the analog modem 100 will not operate. This is because digital telephone lines are only compatible with specific digital devices, such as a digital telephone, a digital coupler, a digital router, etc. However, the modem 100 is usually physically interfaced with a PSTN telephone line via a standard RJ11 jack (not shown), which is also used for a digital line. Namely, the same RJ11 jack is used to physically interface a digital device with a digital telephone line. As such, from visual inspection, it is impossible for a user to determine whether the telephone line is a digital line or a PSTN line. If a user is not aware that the telephone line is a digital line, the digital telephone line can seriously damage many standard analog modems when connected to the digital line. Thus, the present invention is embodied as a new DAA 112 to detect the presence of a digital line, protect the modem 100 from potential hazards of the digital line, and notify the user of the digital line.

Overview of The DAA Component

Referring to FIG. 2, in general, the DM 112 of the modem 100 of the present invention includes a surge current protector 230, a digital line detector 232 and a signal line recycling circuit 234. The surge current protector 230 diverts potentially damaging energy produced by a digital telephone line from sensitive components of the modem 100 during connection with the telephone line 222. The digital line detector 232 detects an overall resistance of the telephone line 222 and the central office limiting circuitry for determining if the telephone line 222 is a digital line. Also, the digital line detector 232 prevents the modem 100 from prolonged connection with the telephone line 222 if it is a digital line. The signal line recycling circuit 234 re-uses the otherwise inactive ring detect signal line to indicate that a digital line is present. The DAA and its components will be discussed in detail below.

Details of the DAA Component

Figure 3:
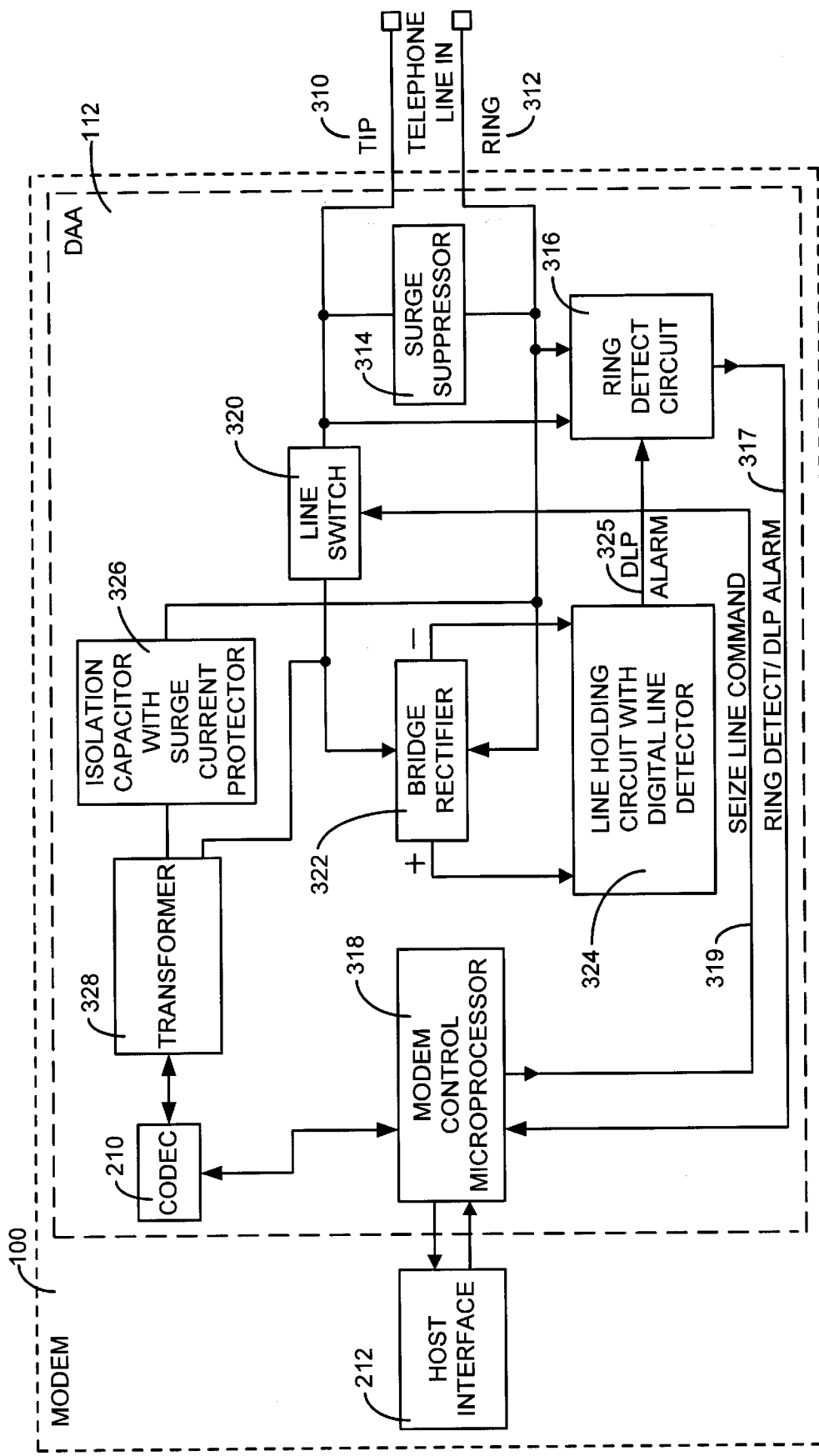
FIG. 3 is a detailed block diagram illustrating the components of the digital access arrangement device for one embodiment of the present invention.

FIG. 3 is a detailed block diagram illustrating the components of the digital access arrangement device for one embodiment of the present invention. The present invention can be implemented as an inexpensive modification of a modem's digital access arrangement (DAA) and its corresponding interface software.

Referring to FIG. 3 along with FIGS. 1–2, the RJ11 jack is designed to interface signals of the telephone line 222 with a telephone device compatible with the telephone line 222 via leads, which can include tip leads 310 and ring leads 312. The leads 310, 312 supply power to specific telephone equipment designed to be used with the telephone line 222. In the description that follows, the telephone line 222 is assumed to be either a PSTN telephone line or a digital telephone line, depending on the illustrative purpose.

For non-digital telephone lines, such as a Public Switched Telephone Network (PSTN) telephone line, power is available as a current limited nominal 48 volts DC across the tip 310 and ring 312 leads. In contrast, for a digital telephone line, 48 volts DC is supplied as non-current limited voltage across tip 310 and ring 312 leads. Hence, digital telephone lines are a potential hazard to standard analog modems.

The DAA 112 of the present invention can be a component of the modem 100. The DAA 112 can include a surge suppressor 314, ring detect circuit 316, modem control microprocessor 318, line switch 320, bridge rectifier 322, line holding circuit with digital detector 324, isolation capacitor with surge current protector 326 and transformer 328. Other components of the modem 100 are the CODEC 210 and the host interface 212.

The surge suppressor 314 is preferably coupled across the tip and ring leads 310, 312. The surge suppressor 314 conducts when the voltage across it exceeds a predefined voltage. The surge suppressor 314 preferably has a relatively large thermal mass, and consequently is able to absorb large stray voltage spikes that can appear on telephone lines.

The ring detect circuit 316 is connected across leads 310 and 312. For a PSTN telephone line, the ring detect circuit 316 conditions an incoming ring signal by stripping away the telephone line's DC bias and limiting the voltage and current of the remaining AC signal. The remaining signal is routed to an optoisolator or equivalent, where it generates a logic level signal 317, which is asserted true when incoming ring signal is active. The actual logic state of signal 317 is usually high when a ring is present, but is a design choice. The ring signal 317 is routed to the attendant microprocessor 318, where the ring signal 317 is analyzed for duration and cadence (time between rings). When ring signal 317 is determined by the microprocessor 318 that it meets a predefined stored profile, the microprocessor 318 asserts a seize-line command signal 319 to activate line switch 320, thereby establishing a connection.

The line switch 320 can be a solid-state relay or a mechanical relay and is connected in series with either lead 310 or lead 312. When energized, for a PSTN telephone line, line switch 320 connects the PSTN telephone line to the bridge rectifier 322, permitting current to flow to the line holding circuit 324. The line switch 320 also connects the isolation capacitor with surge current protector 326 and transformer 328. This connection process is alternatively referred to as going "off-hook," or going "on line." Also, it should be noted that there is no fundamental difference between an optoisolator and a solid state relay. The distinction is more in the intended usage. For instance, if an optoisolator switches power, as opposed to just a signal, it is commonly referred to as a solid state relay.

With the line switch 320 activated, current flows to the bridge rectifier 322. The resultant DC voltage appears at "LINE PLUS" (indicated by +) and at "LINE MINUS" "(indicated by–) of the bridge rectifier 322. The bridge rectifier 322 can be any suitable bridge rectifier for insuring that the proper polarity is presented to the line holding circuit with digital detector 324. For instance, if the incoming tip and ring signals are backwards, the bridge rectifier automatically corrects the polarity before the signals are presented to the line holding circuit with digital detector 324.

The line holding circuit portion of the line holding circuit with digital detector 324 is often referred to as an electronic holding coil, simulated inductor or gyrator. In this embodiment, the line holding circuit is integrated with a digital line detector to form the line holding circuit with digital detector 324. The line holding circuit portion draws DC current from the PSTN telephone line, while appearing transparent to audio signals. The exact configuration and selection of component values can vary, depending on the desired results. Namely, the line holding circuit portion can be adjusted to draw a specified amount of current when the voltage across line holding circuit with digital detector 324 reaches a given level. The line holding circuit is preferably adjusted such that it draws sufficient current to keep the PSTN telephone line in an active state, while not drawing so much current as overheat, and thereby damage, modem circuit components.

The digital line detector portion of the line holding circuit with digital detector 324 provides a novel method of discriminating between a connection to a PSTN telephone line and a digital telephone line. When a PSTN telephone line is seized, the voltage across LINE PLUS and LINE MINUS, which are the inputs to the line holding circuit with digital detector 324, will fall from its nominal 48 volts DC to a much lower value of nominally 5–15 volts DC. This is due to the telephone central office's current limiting circuit and the resistance of the telephone line 222.

In contrast, for a digital telephone line, there is no current limiting of the 48 volt supply, and limited (usually very little) line resistance since digital installations are typically local. As such, during an inadvertent connection to a digital telephone line, the voltage across LINE PLUS and LINE MINUS drops only slightly. The line holding circuit with digital detector 324 detects the presence of the digital telephone line connection by testing the voltage across LINE PLUS and LINE MINUS immediately after the telephone line is seized. If this voltage is found to be significantly higher than what a typical PSTN telephone line connection would be (approximately a 15 volt maximum), the line holding circuit with digital detector 324 reports a fault by asserting an active output to the signal line recycling circuit 234.

With regard to the signal line recycling circuit 234, it is noted that the ring detect circuit 316 has utility only when the telephone line has been disconnected, since it's not possible to ring a telephone device once it is off hook. Consequently, the modem control processor 318 is only programmed to monitor signal line 317 when the circuit is on hook. As such, in accordance with the present invention, the seldom used signal line 317 is recycled and pressed into service as a combination ring detect signal and digital line protection (DLP) alarm signal 317. This does not present a conflict since a ring signal can occur only when the microprocessor 318 has caused an on hook condition, and a digital alarm signal can occur only when the microprocessor 318 has caused an off hook condition. Since the microprocessor 318 recognizes the state of the line seize-line command signal 319, it also recognizes how to process a signal asserted on this dual-purpose ring detect/DLP alarm signal 317.

Accuracy is significantly improved by incorporating a brief time delay between line seize and line test. Since telephone lines contain reactive elements, a certain amount of transient voltage excursion is normal at the time of connection. For this reason, the telephone line cannot be tested immediately after line seizes. As such, a short delay is preferably introduced to allow these transient conditions to die out, and for the DAA 112 to settle to its steady operating state. Preferably, a delay of 200 to 250 milliseconds is incurred. The delay is suitably long enough to allow the DAA circuit 112 to settle and short enough to prevent heat damage to the DAA's 112 components.

While the delay can be introduced by adding a time delay circuit to the hardware design, a zero cost alternative involves pre-programming the microprocessor 318 to delay testing ring detect/DLP alarm signal 317 for the preferred interval, such as 200 milliseconds. Action taken by the microprocessor 318 in the event ring detect/DLP alarm signal 317 is asserted, other than immediately un-seizing the digital telephone line is discretionary. A typical scenario would include a 30-second delay to prevent a second connect attempt, notification of the operator of a hazard condition, and similar actions.

Transformer 328 is a typical modem transformer and preferably has excellent AC characteristics, but is not designed for any DC current. Therefore, capacitance can be added in series with the transformer 328. Together these components form the audio-processing portion of the DAA 112. To avoid damage to the capacitor during connection to a digital telephone line, the capacitor can be rated higher than 50 volts DC. However, this means a very large capacitor will be required. Alternatively, for digital telephone line protection an isolation capacitor with surge current protector 326 in accordance with the present invention is preferably utilized.

The isolation capacitor with surge current protector 326 of the present invention is coupled to the transformer 328. The isolation capacitor portion is used to add capacitance in series with the transformer 328. In order to conserve valuable space on the DAA 112, the isolation capacitor is preferably rated well below 50 volts DC, and thus, requires high voltage protection. Thus, a surge current protector portion is incorporated with the isolation capacitor portion. The surge current protector is suitably configured to protect the isolation capacitor portion from damage, for instance, during turn-on of the modem 100. This can be accomplished, for example, by bypassing higher voltages or by forcing energy produced by the excess voltage to be diverted to the transformer 338. The surge current protector portion can be any suitable circuit for accomplishing the diversion.

For a PSTN telephone line, secondary signals from the transformer 328 are routed to the CODEC 210 through diplexer network 430, which separates the incoming and outgoing signals. The transformer 328 can include devices for protecting the circuit from voltage spikes and providing some high-frequency noise roll off, as well as performing some phase compensation for the transformer's performance limitations. If a PSTN telephone line is detected, the CODEC 210 receives digital signals from the microprocessor 318 and converts them into tones. At the same time the CODEC 210 receives incoming tones and converts them into digital signals for the microprocessor 318 to process.

Working Example

Figure 4:
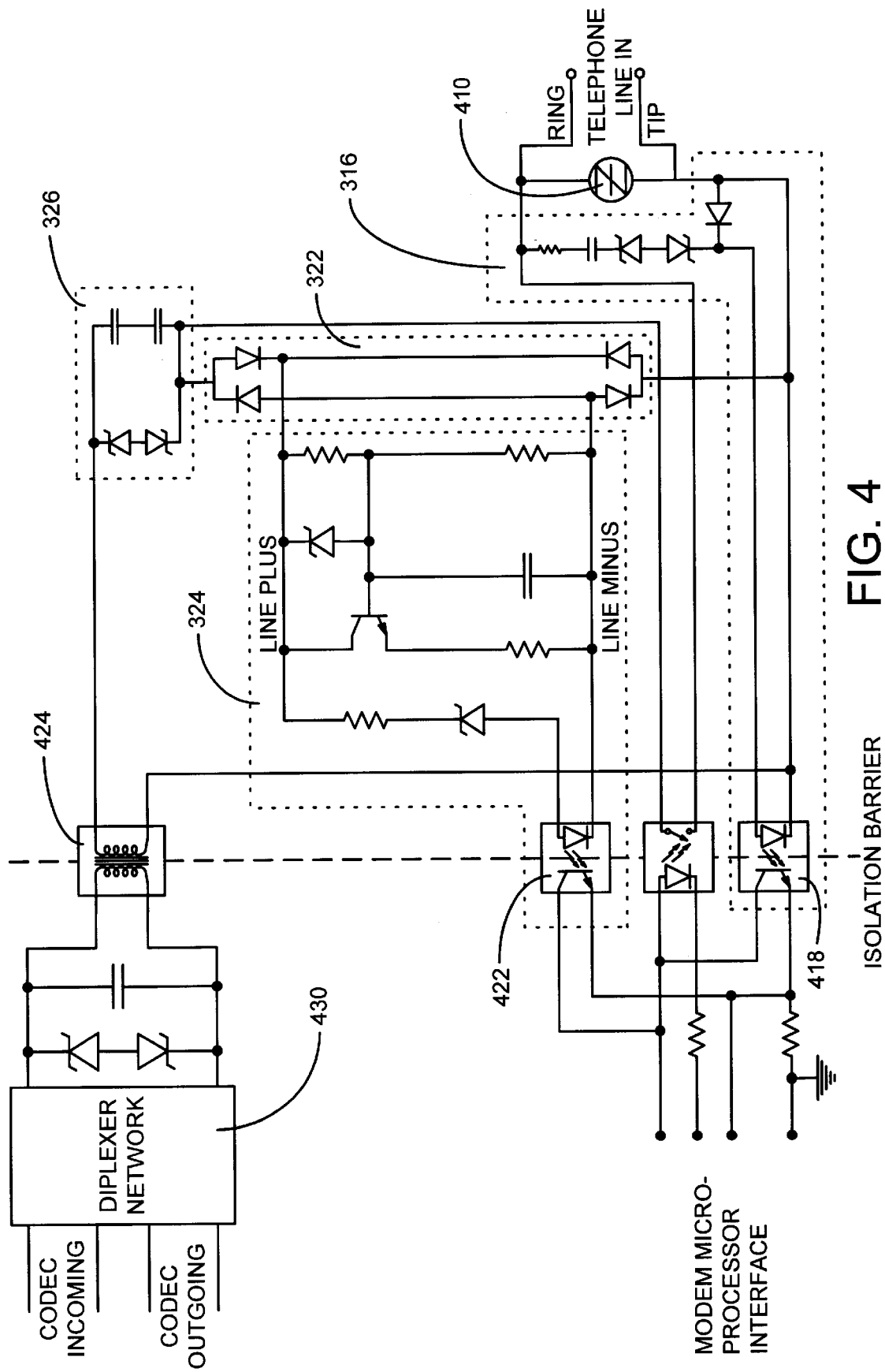
FIG. 4 is an electrical schematic of a working example of FIG. 3 of the present invention.

FIG. 4 is an electrical schematic of a working example of FIG. 3 of the present invention. The components of FIG. 4 are described with sample values as one working example for illustrative purposes only. Referring to FIG. 4 along with FIG. 3, a thyristor 410 can be used as the surge suppression device 314. The thyristor 410 is preferably rated at 310 volts and conducts when the voltage across it exceeds approximately 310 volts. The ring detect circuit 316, can consist of a resistor, capacitor, two zener diodes, a shorting diode and an optoisolator. For instance, the working example can utilize a 7500 ohm resistor, a 33 microfarad capacitor rated at 200 volts, two 18 volt zener diodes, a suitable shorting diode and an optoisolator 418 consisting of a light emitting diode (LED) coupled to a transistor, as shown in FIG. 4.

With the above specifications, the resistor is able to limit the ring signal's current, the capacitor can strip away the telephone line's DC bias, and the zener diodes are able to limit the remaining signal to approximately 18 volts maximum. The resulting signal activates the LED of the optoisolator 418. While the optoisolator 418 LED's are tolerant of high currents in the conducting direction, they are limited in their ability to withstand signals in the reverse direction. Consequently, a sufficiently rated diode can be used as the shorting diode to short out any reverse current flow.

As shown in FIG. 4, the ring signal 317 of FIG. 3 is preferably held at ground via its connection to a 20,000 ohm resistor and a 560 ohm resistor can be used to limit the current of the seize-line command signal 319 of FIG. 3. A set of appropriately rated diodes can be used as the bridge rectifier circuit 322. For PSTN telephone line purposes, the line holding circuit with digital line detector 324 can include a 54,000 ohm resistor and a 75,000 ohm resistor for setting the conduction level of the optoisolator 418 and a 10 microfarad capacitor rated at 18 volts for preventing the circuit from responding to AC signals. Also, a suitably rated resistor and transistor can be employed for dissipating the current being drawn.

For digital telephone line purposes, a zener diode with a threshold voltage, such as 15 volts, can be connected in a series loop with a suitably rated resistor, such as 2500 ohms, and a suitably rated optoisolator 422 across LINE PLUS AND LINE MINUS, as shown in FIG. 4. The optoisolator 422 can consist of a transistor and LED. As discussed above, for a PSTN telephone line, no current flows through this loop since the nominal voltage would be at or below a threshold voltage, such as 15 volts. However, if the voltage across the LINE points were to rise above 15 volts, the 15 volt zener diode would conduct and the LED of the optoisolator 422 would turn on indicating that a digital line is present. The 2500 ohm resistor is included to limit the amount of current seen by the optoisolator 422 under extreme fault conditions.

For recycling purposes, the secondary of the optoisolator 422 is preferably wired across optoisolator 418 as a logic OR function. As discussed above, by definition, a ring signal can only be received if the modem is on hook. Consequently, typical modems are programmed to only monitor the ring signal line when the circuit is on hook. As such, in accordance with the present invention, the seldom used ring signal line is recycled by the circuit 324 and pressed into service as the combination ring detect signal and digital line protection (DLP) alarm signal 317. A short delay is preferably introduced to allow transient conditions to die out and to allow settling to steady operating state. Preferably, a delay of 200 to 250 milliseconds is used. The delay can be introduced by adding a time delay circuit or pre-programming the microprocessor to delay testing ring detect/DLP alarm signal for a preferred interval, such as 200 milliseconds. If the ring detect/DLP alarm signal is asserted a digital telephone line is present and can be un-seized.

A transformer 424 can be coupled to a 0.001 microfarad capacitor for providing some high-frequency noise roll off, as well as for performing some phase compensation for the transformer's performance limitations. A set of suitable zener diodes, such as 5 volt zener diodes, can be employed for protecting the circuit from voltage spikes. The transformer 424 can be coupled to the CODEC 210 via an appropriate diplexer network 430.

The isolation capacitor with surge current protector 326 can be a set of isolation capacitors with a surge current protection circuit coupled to the transformer 424. The isolation capacitors can be two 39 microfarad capacitors rated at 16 volts for adding capacitance in series with the transformer 424. To protect the capacitors from the hazards of a digital telephone, a pair of back-to-back zener diodes, such as 16 volt zener diodes can be located across the capacitors and can be used as the surge current protection circuit. During turn-on of the connection between the modem and a digital telephone line, the zener diodes force energy produced by the excess voltage of the digital line to be diverted to the transformer 424.

Integrated Stand Alone DAA

Figure 5:
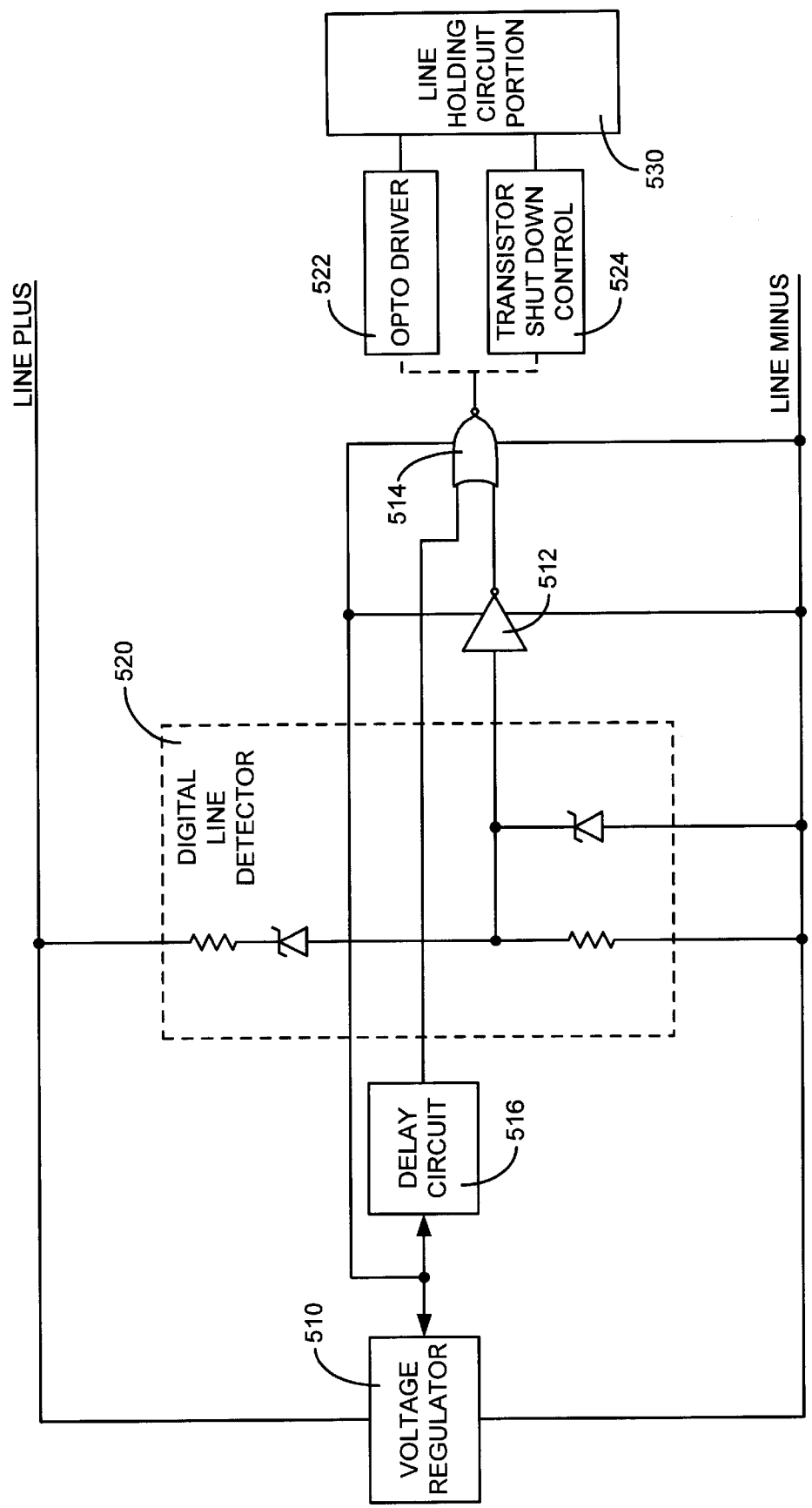
FIG. 5 is a detailed block diagram illustrating the components of an alternative digital access arrangement device for an alternative embodiment of the present invention.

Components:

FIG. 5 is a detailed block diagram illustrating the components of an alternative digital access arrangement device for an alternative embodiment of the present invention. In this alternative embodiment, the present invention implemented as a stand alone DAA, without software modification. Reference is made to FIG. 4 along with FIG. 5. For digital telephone line purposes, instead of the zener diode connected in a series loop with the 2500 ohm resistor and a suitably rated optoisolator 422 across LINE PLUS AND LINE MINUS, as shown in FIG. 4, an alternate digital detector is configured and coupled to LINE PLUS AND LINE MINUS as shown in FIG. 5.

Namely, the arrangement includes a voltage regulator 510, a logic inverter 512, a logic gate 514, such as a NOR gate, a delay circuit 516 and a detection circuit 520. The detection circuit 520 is preferably comprised of two resistors, such as 1300 ohm and 1500 ohm resistors and two zener diodes, such as 11 volt and 4.7 volt zener diodes, as shown in FIG. 5.

Operation:

The voltage regulator 510, such as a +5 volt regulator, drops the telephone line voltage down and provides a steady supply of voltage for logic inverter 512, logic gate 514 and the delay circuit 516, such as a 200 millisecond delay circuit. The delay circuit 516 activates when the telephone line is seized. With a 200-millisecond delay circuit, the output of the delay circuit goes high for 200 milliseconds.

With the above configuration for the detection circuit 516, the 1300 ohm resistor limits the current, the 11 volt zener diode will turn on if the line voltage exceeds 11 volts, and the 1500 ohm resistor provides a voltage drop, with an output of about 5 volts, if the detection circuit 516 activates. The 4.7 volt zener diode protects the components of the detection circuit 520 by limiting the voltage across the 1500 ohm resistor. The logic inverter 512 inverts the sense of the detection circuit 516. Thus, the output of the logic inverter 512 will go high if a PSTN telephone line is present, but will go low if a digital telephone line is detected.

The NOR gate 514 has two inputs, the delay signal from the delay circuit 516 and a low-true alarm signal from the logic inverter 512. The only condition where the output of the NOR gate 514 will be asserted is if both inputs are low. This can occur only when the delay circuit has timed out, and the digital telephone line signal is present. The high output of the NOR gate 514 is the actual "alarm" signal and can be used to activate an optorelay, as in FIG. 4 above. Alternatively, the NOR gate 514 can simply activate a transistor that can turn off the line holding circuit portion 530 of the line holding circuit with digital detector 324 of FIG. 4.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for protecting an electronic device connected to a telephone line of a central office, comprising:
    determining an overall resistance of the telephone line and limiting circuitry of the central office;
    utilizing the overall resistance to determine if the telephone line is a digital line;
    recycling an inactive ring signal of the telephone line if the telephone line is a digital line; and
    preventing the electronic device from prolonged connection with the telephone line if the inactive ring signal is recycled.

2. The method of claim 1, wherein the electronic device is a modem.

3. The method of claim 2, wherein determining an overall resistance includes obtaining a voltage drop at the modem after the modem connects with the telephone line.

4. The method of claim 3, wherein utilizing the overall resistance includes comparing the voltage drop with a threshold value and using the comparison to categorize the voltage drop as associated with at least one of a non-digital line and a digital line.

5. The method of claim 2, wherein preventing the modem from prolonged connection with the telephone line if it is a digital line includes disconnecting the modem from the telephone line and notifying a user of the modem that the telephone line is a digital telephone line.

6. The method of claim 1, further comprising sufficiently delaying the step of determining an overall resistance of the telephone line and limiting circuitry of the central office so as to allow a steady operating state without damaging the electronic device.

7. The method of claim 6, wherein the delay is within a range of 200 to 250 milliseconds.

8. The method of claim 6, wherein the delay is performed by at least one of a delay circuit and a preprogrammed instruction module of a computer readable medium.

9. The method of claim 1, further comprising diverting potentially damaging energy produced by the telephone line from sensitive components of the electronic device during connection with the telephone line.

10. The method of claim 1, wherein the inactive ring signal is utilized only during active connection with telephone line.

11. A protection device for protecting a modem connected to a telephone line of a central office, comprising:
 a detector for determining an overall resistance of the telephone line and limiting circuitry of the central office and utilizing the overall resistance to determine if the telephone line is a digital line; and
 an alarm circuit for preventing the electronic device from prolonged connection with the telephone line if it is a digital line, the alarm circuit comprising a ring detect circuit that recycles an inactive ring signal of the telephone line if the telephone line is a digital line.

12. The protection device of claim 11, wherein the ring detect circuit utilizes the ring signal during active connection with the telephone line.

13. The protection device of claim 11, wherein the alarm circuit disconnects the modem from the telephone line if the telephone line is determined to be a digital line and notifies a user of the modem that the telephone line is a digital telephone line.

14. The protection device of claim 10, further comprising a delay circuit for sufficiently delaying determining an overall resistance of the telephone line and limiting circuitry of the central office so as to allow a steady operating state without damaging the electronic device.

15. The protection device of claim 14, wherein the delay is within a range of 200 to 250 milliseconds.

16. The protection device of claim 14, wherein the delay circuit is a preprogrammed instruction module of a computer readable medium.

17. The protection circuit of claim 10, further comprising a diversion circuit for diverting potentially damaging energy produced by the telephone line from sensitive components of the electronic device during connection with the telephone line.

18. The protection circuit of claim 17, wherein the diversion circuit is a surge current protector.

19. The protection device of claim 10, wherein the detector comprises a line holding circuit with digital detector.

20. The protection device of claim 11, wherein the detector tests a voltage drop at the modem after the modem connects with the telephone line.

21. The protection device of claim 20, wherein the detector compares the voltage drop with a threshold value and uses the comparison to categorize the voltage drop as associated with at least one of a non-digital line and a digital line.

22. A diversion circuit for preventing electrical damage to sensitive electronic components of a modem connected to a telephone line, comprising:
 a detector for determining if the telephone line is a digital line;
 a ring detect circuit that recycles an inactive ring signal of the telephone line if the telephone line is a digital line; and
 a diversion circuit for diverting potentially damaging energy produced by the digital line from the sensitive components of the electronic device during connection with the digital line.

23. The diversion device of claim 22, wherein the diversion circuit is a surge current protector.

24. The diversion device of claim 22, wherein the diversion circuit diverts potentially damaging energy produced by the digital line from isolation capacitors when the modem is turned on.

25. The diversion device of claim 21, wherein the diversion circuit diverts potentially damaging energy produced by the digital line from isolation capacitors during determination of the type of telephone line.

26. The diversion device of claim 22, further comprising a fault sensor for preventing the electronic device from prolonged connection with the telephone line if it is a digital line.

* * * * *